United States Patent
Gondre et al.

(10) Patent No.: US 11,920,494 B2
(45) Date of Patent: Mar. 5, 2024

(54) TURBOMACHINE ROTARY-FAN BLADE, FAN AND TURBOMACHINE PROVIDED THEREWITH

(71) Applicant: Safran Aircraft Engines, Paris (FR)

(72) Inventors: Guillaume Pascal Jean-Charles Gondre, Moissy-Cramayel (FR); Thomas Alain De Gaillard, Moissy-Cramayel (FR); Pierre Jean Faivre D'arcier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/913,946

(22) PCT Filed: Mar. 24, 2021

(86) PCT No.: PCT/FR2021/050500
§ 371 (c)(1),
(2) Date: Sep. 23, 2022

(87) PCT Pub. No.: WO2021/191559
PCT Pub. Date: Sep. 30, 2021

(65) Prior Publication Data
US 2023/0129130 A1 Apr. 27, 2023

(30) Foreign Application Priority Data
Mar. 26, 2020 (FR) ..................... 2002990

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F05D 2220/323* (2013.01); *F05D 2240/30* (2013.01)

(58) Field of Classification Search
CPC ..... F01D 5/147; F01D 5/282; F05D 2240/303
(Continued)

(56) References Cited

U.S. PATENT DOCUMENTS

| 7,780,410 B2 * | 8/2010 | Kray ....................... B23P 15/04 416/223 R |
| 2005/0106002 A1 | 5/2005 | Gerez et al. |

(Continued)

FOREIGN PATENT DOCUMENTS

| EP | 1382799 A2 | 1/2004 |
| EP | 2514922 A2 | 10/2012 |

(Continued)

OTHER PUBLICATIONS

International Search Report, issued in PCT/FR2021/050500, PCT/ISA/210, dated Jul. 14, 2021.

(Continued)

*Primary Examiner* — Michael L Sehn
(74) *Attorney, Agent, or Firm* — Birch, Stewart, Kolasch & Birch, LLP

(57) ABSTRACT

The present invention relates to a turbomachine rotary-fan blade (2), comprising a body (20) made of a composite material, a metal reinforcement part (3) comprising a metal upstream nose (31), characterised in that the metal upstream nose (31) comprises, at least on the metal part (27b) of the blade tip, a recess (4) of longitudinally tapering thickness (AX), delimiting on the metal part (27b) over a height (H) at least one metal projection (5) with prescribed wear, which has a longitudinally tapering thickness and which is configured to detach at least partially in the presence of tangential friction in the second thickness direction (EP) against the metal part (27b), the recess (4) and the metal projection (5) with prescribed wear extending the first metal fin (32) and/or (Continued)

the second metal fin (33) and/or the upstream edge (22) of the body (20) made of composite material.

13 Claims, 11 Drawing Sheets

(58) Field of Classification Search
USPC .......................................................... 416/224
See application file for complete search history.

(56) References Cited

U.S. PATENT DOCUMENTS

| | | |
|---|---|---|
| 2008/0075601 A1 | 3/2008 | Giusti et al. |
| 2008/0159868 A1 | 7/2008 | Kray et al. |
| 2009/0129934 A1 | 5/2009 | Gu |
| 2019/0242260 A1 | 8/2019 | Kray et al. |

FOREIGN PATENT DOCUMENTS

| | | |
|---|---|---|
| EP | 3034785 A2 | 6/2016 |
| EP | 3034787 A2 | 6/2016 |
| EP | 3245386 A1 | 11/2017 |
| GB | 1107024 A | 3/1968 |
| WO | WO2016/114888 A1 | 7/2016 |

OTHER PUBLICATIONS

Written Opinion of the International Searching Authority, issued in PCT/FR2021/050500, PCT/ISA/237, dated Jul. 14, 2021.

\* cited by examiner

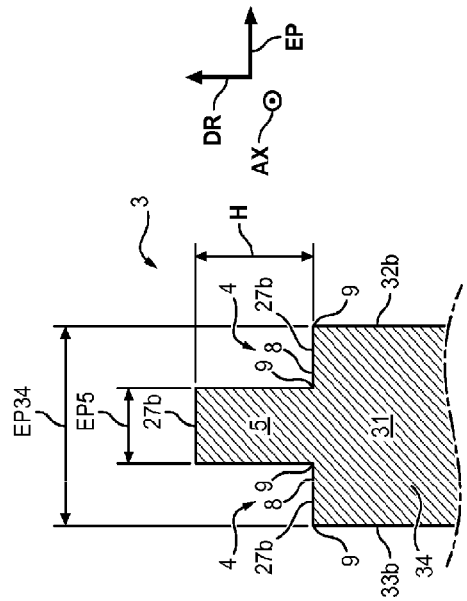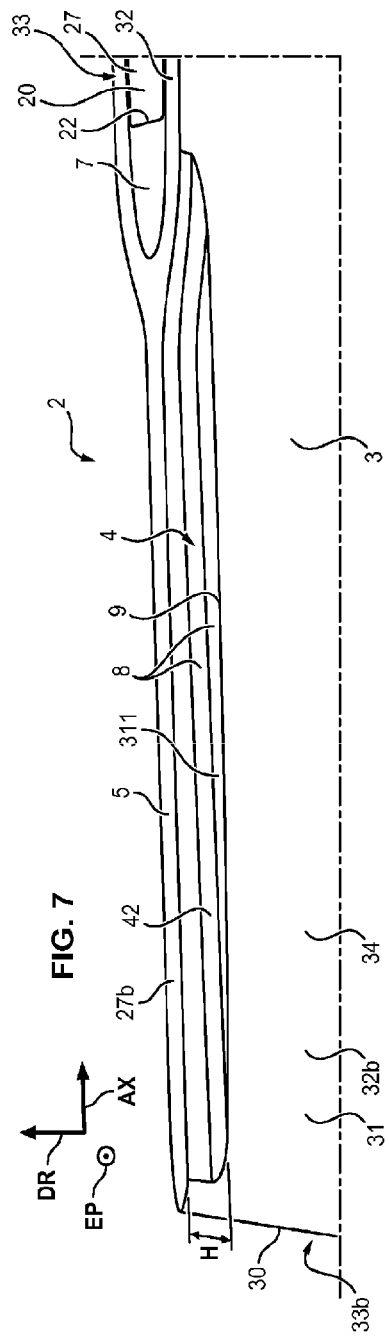
FIG. 6
FIG. 7

TURBOMACHINE ROTARY-FAN BLADE, FAN AND TURBOMACHINE PROVIDED THEREWITH

The invention relates to a rotary turbomachine fan blade, a rotary turbomachine fan provided therewith and a turbomachine provided therewith.

The field of the invention relates to aircraft turbomachines, in particular turbojet engines or turboprops.

It is known that the rotary turbomachine fan blades rotate in a fixed casing surrounding them with a clearance between the blades and the casing, which is internally covered with an abradable material that can be planed by the blade heads in rotation. Document EP-A-1 312 762 describes such blades, whose tips may be disintegrated by the inner wall of the retention casing in case of impact following the appearance of an unbalance having caused the decoupling of the bearing, in order to obtain a larger clearance necessary for the operation of the decoupler. According to this document, each blade has near its tip a weakened area made by means of a groove arranged, parallel to its tip, on the extrados face. This groove is filled with a resin which ensures the aerodynamic continuity of the extrados in the vicinity of the tip. The groove is arranged in the base material of the blade to a depth such that the remaining wall in base material of the weakened area on the leading edge, intrados and trailing edge sides has sufficient resistance to allow planing of the layer of abradable material and is fragile enough to break on the occurrence of an impact between the tip of the blade and the internal wall of the retention casing.

The rotational movement R of the engine rotating the blade 2 with the association of various outer elements such as for example the ingestion of birds, or vibratory phenomena, can induce sudden and significant contacts between the blade head 27 and the abradable material 301 located on the casing 300 of the fan, as represented in FIG. 1.

This contact between the blade and the casing can be the cause of significant damage. Indeed, a punctual and sudden contact can lead to the deformation of the blade, which will increase the contact in terms of surface of the blade or depth of contact in the abradable material. If the phenomenon is not controlled, it may result in damage to the blade to the point of significant losses of materials.

To avoid this case, the radial clearance J at the head of the fan 280 and the volume of the blade 2 are dimensioned so as to avoid the engagement of the latter in the abradable material to the point of damage to the engine.

Studies have shown that when the blade operates at high rotation speed, it deforms under the centrifugal effect and the aerodynamic forces. The radial clearance J at the blade head decreases and it turns out that in some cases, this clearance J does not ensure sufficient margin to avoid the contact between the blade head 27 and the abradable material. This friction induces on the blade head 27 a tangential load, schematized by the arrows F in FIG. 2, directed from the intrados 24 towards the extrados 25 of the blade 2 and this in the direction opposite to the rotation of the blade 2 about the axis AX of rotation of the engine.

This constraint implies an additional deformation of the blade. Several cases can then arise.

According to a first case, if this deformation induces an increase in clearance so as to reduce the forces and disengage the airfoil from the abradable material, the blade is defined as non-self-engaging. It is then estimated that in this first case, the behavior of the blade is healthy when it comes into contact with the abradable material.

On the contrary, according to a second case, if a positive clearance consumption is induced by the deformation, the blade is defined as self-engaging. In this second case, the blade will continue to sink into the abradable material and the forces on the blade will increase. The blade and the surrounding portions thereof can then suffer serious damage.

The simplest solution to avoid this self-engagement phenomenon or at least reduce its criticality is to increase the clearance at the blade head in order to have an additional margin before the contact of the blade with the abradable material. This strategy allows avoiding any damage to the engine but can have a significant impact on the aerodynamic performances of the blading. Increasing the clearance at the head increases the leakage flow rate and the associated losses in this area.

In addition, it is sought to avoid configurations of the leading edge of the blade head which, in case of self-engagement, are hardly detached due to their geometric profile and increase the criticality of the self-engagement.

A first goal of the invention is to obtain a rotary turbomachine fan blade, making it possible to limit the criticality of the self-engagement of the blade head on the leading edge without deteriorating aerodynamic performances.

A second goal of the invention is to obtain a rotary turbomachine fan blade, making it possible to avoid configurations of the leading edge of the blade head which, in case of self-engagement, are hardly detached due to their geometric profile and increase the criticality of the self-engagement.

To this end, a first subject matter of e invention is a rotary turbomachine fan blade, the blade comprising:
- a body made of a composite material, having an upstream edge and a downstream edge, between which the body extends along a first longitudinal direction, an extrados and an intrados, between which the body extends along a second thickness direction, Which is transverse to the first direction, a blade root and a blade head edge, between which the body extends along a third height direction, transverse to the first and second directions, the blade root having the function of attachment on a longitudinal rotary fan hub,
- a metallic reinforcement part comprising an upstream metallic nose, which forms a leading edge of the blade and which is fixed to the upstream edge, a first metallic fin, which is connected downstream of a first extrados flank of the upstream metallic nose and which is fixed to an upstream portion of the extrados, and a second metallic fin, which is connected downstream of a second intrados flank of the upstream metallic nose and which is fixed to an upstream portion of the intrados, the upstream metallic nose having a metallic blade head portion, located upstream of the blade head edge,
the blade being characterized in that
- the upstream metallic nose comprises at least on the metallic blade head portion at least one recess, which is of longitudinally elongated thickness and which is opening out along the third height direction on the metallic blade head portion,
- the at least one recess delimiting on the metallic blade head portion over a determined non-zero height along the third height direction at least one metallic prescribed wear protrusion, which is of longitudinally elongated thickness and which is configured to be detached at least partially in the presence of tangential friction in the second thickness direction against the metallic blade head portion, the at least one recess and the at least one metallic prescribed wear protrusion extending, in the first longitudinal direction upstream, the first metallic fin and/or the second metallic fin and/or the upstream edge of the body made of a composite material.

Thanks to the invention, the metallic prescribed wear protrusion provided at the metallic blade head can be sufficient to avoid the self-engagement of the assembly of the blade from its leading edge. The wear of the metallic prescribed wear protrusion of the blade head during its possible rotation against the abradable material of the fan casing can be gradual to maintain a sufficient height of the blade head reducing the leakage flow rate between the blade and this casing, while avoiding the self-engagement of the second case mentioned above. The protrusion with prescribed rupture or fusible area on a self-engaging blade allows disengaging the blade upon contact, thus limiting damage to the blade head. Thus, rather than changing many parts during a critical event leading to a self-engagement phenomenon of the blade, only the blade can be repaired or replaced. The determination of the clearances at the blade head no longer takes into account the self-engaging nature of a blade. It is then possible to reduce the clearances, which improves the aerodynamic performances of the blade. Thus, the dimensioning of a blade according to the engine target (diameter, speed of rotation, etc.) will determine the optimal solution to make the area with prescribed rupture among the proposed embodiments.

According to an embodiment of the invention, the at least one metallic prescribed wear protrusion is of longitudinally tapered thickness over a major portion of a length of the upstream metallic nose along the first elongated direction.

According to an embodiment of the invention, the longitudinally elongated thickness of the metallic prescribed wear protrusion is constant at least over a portion of the determined non-zero height.

According to an embodiment of the invention, the longitudinally elongated thickness of the metallic prescribed wear protrusion is constant over a major portion of the length of the upstream metallic nose.

According to an embodiment of the invention, the metallic blade head portion has a thickness increasing from upstream to downstream, the at least one recess is delimited by ridges of the upstream metallic nose, wherein the thickness occupied by the at least one recess relative to the ridges increases from upstream to downstream over a major portion of the length of the upstream metallic nose.

According to an embodiment of the invention, the metallic blade head portion has a thickness increasing from upstream to downstream, the at least one recess is delimited by ridges of the upstream metallic nose, wherein said determined non-zero height occupied by the at least one recess relative to the ridges decreases from upstream to downstream over a major portion of a length of the upstream metallic nose.

According to an embodiment of the invention, the at least one recess is formed by at least one shoulder, which is connected to the first extrados flank of the upstream metallic nose.

According to an embodiment of the invention, the at least one recess is formed by a shoulder, which is connected to the second intrados flank of the upstream metallic nose. The shoulder can comprise a curve.

According to an embodiment of the invention, the upstream metallic nose comprises as a recess at least a first recess, which is formed by a first shoulder connected to the first extrados flank of the upstream metallic nose, and at least a second recess, which is formed by a second shoulder connected to the second intrados flank of the upstream metallic nose.

According to an embodiment of the invention, the shoulder is curved.

According to an embodiment of the invention, the metallic prescribed wear protrusion surrounds the at least one recess.

According to an embodiment of the invention, the blade head edge comprises another metallic prescribed wear protrusion, which is of longitudinally elongated thickness and which extends the at least one metallic prescribed wear protrusion. Thus, if it is considered that the protrusion of the reinforcement part is a first protrusion, the other prescribed wear protrusion on the blade head edge of the body of the blade is an additional protrusion completing the first protrusion of the metallic reinforcement part in its extension in the first longitudinal direction.

A second subject matter of the invention is a rotary turbomachine fan, comprising a longitudinal rotary fan hub and a plurality of blades as described above, which are fixed by their blade root to the longitudinal rotary fan hub.

A third subject matter of the invention is a turbomachine comprising a rotary fan as described above, and, downstream of the fan, a low-pressure compressor, a high-pressure compressor, a combustion chamber, a high-pressure turbine and a low-pressure turbine.

The invention will be better understood upon reading the following description, given only by way of non-limiting example with reference to the figures below of the appended drawings.

FIG. 6 represents an enlarged schematic cross-sectional view of the blade head according to the first embodiment of the invention.

FIG. 7 represents an enlarged schematic perspective view of the blade head according to a second embodiment of the invention.

One example of a turbomachine 1 on which the rotary fan blade(s) 2 according to the invention can be used is described below in more detail with reference to FIG. 3.

Figure 1:
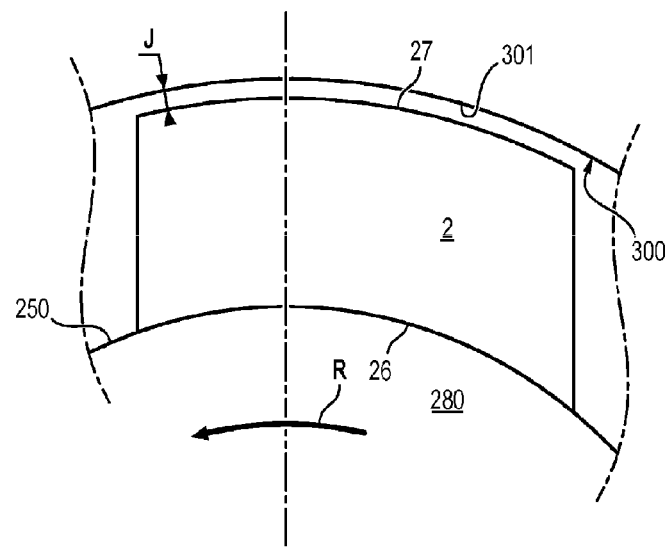
FIG. 1 represents a schematic front view of a blade according to the state of the art.
Figure 2:
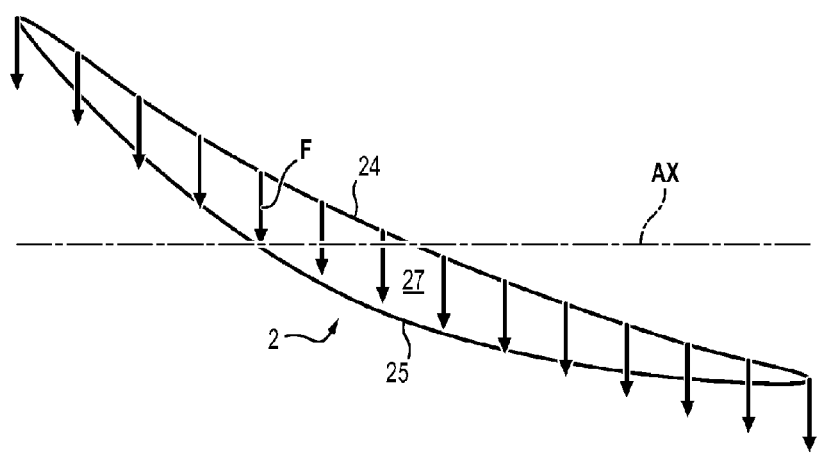
FIG. 2 represents a schematic view along a radial direction of the head of a blade according to the state of the art.
Figure 3:
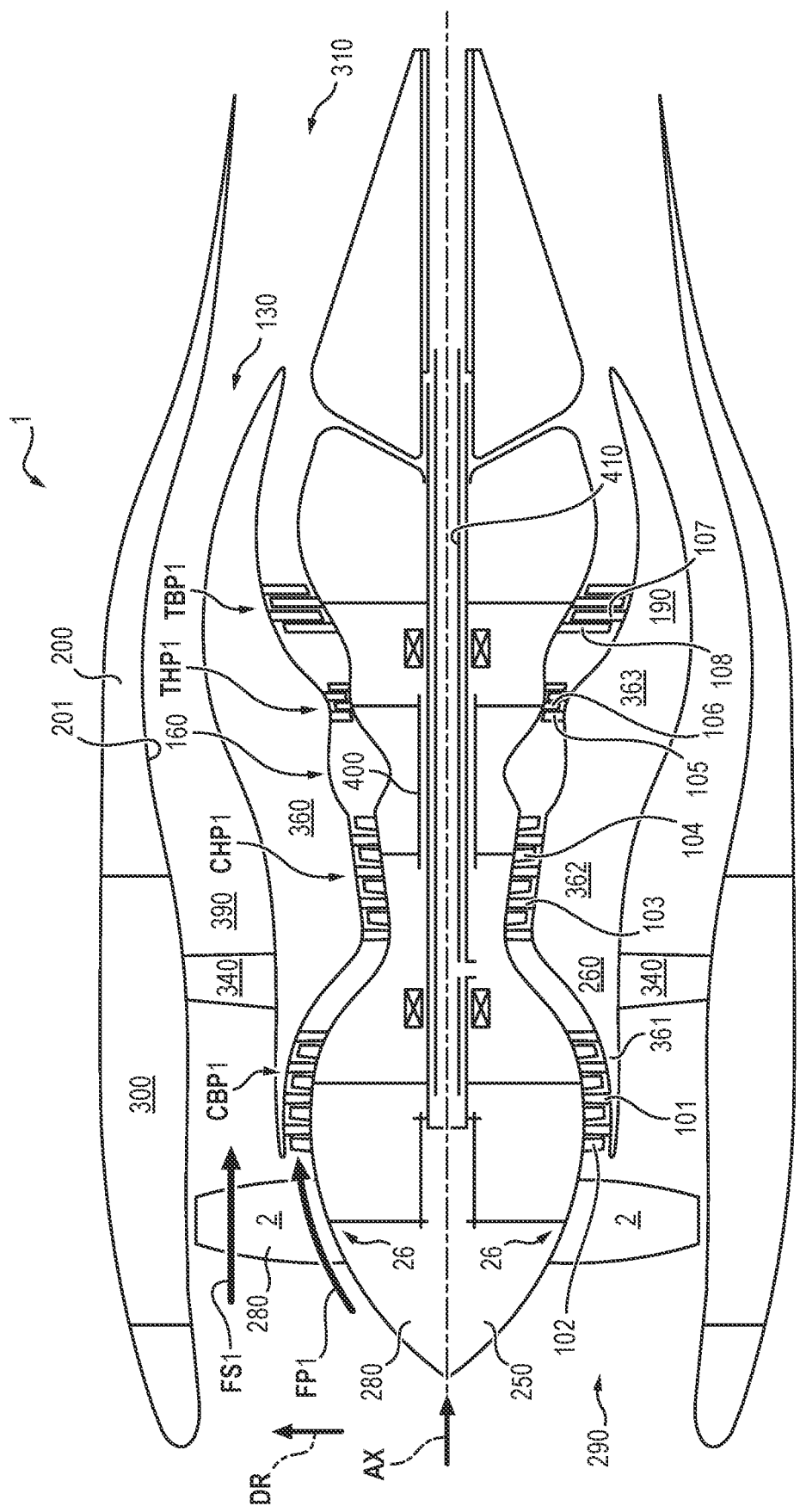
FIG. 3 represents a schematic axial sectional view of a turbomachine, comprising the blade according to the invention.

As known, the turbomachine 1 represented in FIG. 3 is intended to be installed on an aircraft, not represented, in order to propel it through the air.

The gas turbine engine or turbomachine assembly 1 extends about an axis AX or axial direction AX (or first longitudinal direction AX mentioned below) oriented from upstream to downstream. Subsequently, the terms "upstream", respectively "downstream" or "front", respectively "rear", or "left" respectively "right" or "axially" are taken along the general direction of the gases flowing in the turbomachine along the axis AX. The direction from inside to outside is the radial direction DR (or third height direction DR mentioned below) starting from the axis AX.

The turbomachine 1 is for example a double-body turbomachine. The turbomachine 1 comprises a first stage formed by a rotary fan 280 and a central gas turbine engine 130, located downstream of the rotary fan 280. Central to the turbomachine, the gas turbine engine 130 comprises, from upstream to downstream in the gas flow direction, a low-pressure compressor CBP1, a high-pressure compressor CHP1, a combustion chamber 160, a high-pressure turbine TI-IPI and a low-pressure turbine TBP1, which delimit a primary gas stream FP1.

The rotary fan 280 comprises a set of rotary fan blades 2 extending radially outwardly from a rotary fan hub 250. The rotary fan blades 2 are surrounded externally by a fan casing 300, comprising one or several layer(s) 301 of an abradable material on its surface located facing the blade heads 27 of the blades 2.

The turbomachine 1 has an upstream intake end 290 located upstream of the fan 280, and a downstream exhaust end 310. The turbomachine 1 also comprises an inter-flowpath casing 360 which delimits a primary flowpath in which the primary stream FP1 circulates which passes through, downstream of the fan 280, the low-pressure compressor CBP1, the high-pressure compressor CHP1, the high-pressure turbine THP1 and the low-pressure turbine TBP1.

The inter-flowpath casing 360 comprises, from upstream to downstream, a casing 361 of the low-pressure compressor CBP1, an intermediate casing 260, which is interposed between the low-pressure compressor CBP1 and the high-pressure compressor CHP1, a casing 362 of the high-pressure compressor CHP1, a casing 363 of the high-pressure turbine THP1 and a casing 190 of the low-pressure turbine TBP1.

The low-pressure compressor CBP1 and the high-pressure compressor CHP1 can each comprise one or several stage (s), each stage being formed by a set of fixed vanes (or stator blading) and a set of rotary blades (or rotor blading).

The fixed vanes 101 of the low-pressure compressor CBP1 are fixed to the casing 361. The rotary blades 102 of the low-pressure compressor CBP1 are fixed to a first rotary transmission shaft 410.

The fixed vanes 103 of the high-pressure compressor CHP1 are fixed to the casing 362. The rotary blades 104 of the high-pressure compressor CHP1 are fixed to a second rotary transmission shaft 400.

The high-pressure turbine THP1 and the low-pressure turbine TBP1 can each comprise one or several stage(s), each stage being formed by a set of fixed vanes (or stator blading) and a set of rotary blades (or rotor blading).

The fixed vanes 105 of the high-pressure turbine THP1 are fixed to the casing 363. The rotary blades 106 of the high-pressure turbine THP1 are fixed to the second rotary transmission shaft 400.

The fixed vanes 107 of the low-pressure turbine TBP1 are fixed to the casing 190. The rotary blades 108 of the low-pressure turbine TBP1 are fixed to the first rotary transmission shaft 410.

The rotary blades 108 of the low-pressure turbine TBP1 drive the rotary blades 102 of the low-pressure compressor CBP1 in rotation about the axis AX under the effect of the thrust of the gases coming from the combustion chamber 160. The rotary blades 106 of the high-pressure turbine THP1 drive the rotary blades 104 of the high-pressure compressor CHP1 in rotation about the axis AX under the effect of the thrust of the gases coming from the combustion chamber 160.

The rotary fan blades 2 are upstream of the blades 101, 102, 103, 104, 105, 106, 107 and 108 and are of a different shape therefrom.

In operation, the air flows through the rotary fan 280 and a first portion FP1 (primary stream FP1) of the air stream is routed through the low-pressure compressor CBP1 and the high-pressure compressor CHP1, in which the air stream is compressed and sent to the combustion chamber 160. The hot combustion products (not represented in the figures) coming from the combustion chamber 160 are used to drive the turbines THP1 and TBP1 and thus produce the thrust of the turbomachine 1. The turbomachine 1 also comprises a secondary flowpath 390 which is used to pass a secondary stream FS1 of the air stream discharged from the rotary fan 280 around the inter-flowpath casing 360. More specifically, the secondary flowpath 390 extends between an inner wall 201 of a fairing 200 or nacelle 200 and the inter-flowpath casing 360 surrounding the central gas turbine engine 130, the fan casing 300 being the upstream portion of this fairing 200 or nacelle 200. Arms 340 connect the intermediate casing 260 to the inner wall 201 of the fairing 200 in the secondary flowpath 390 of the secondary stream FS1.

Below, the rotary turbomachine fan blade 2 according to the invention is described with reference to FIGS. 4 to 17.

Figure 4:
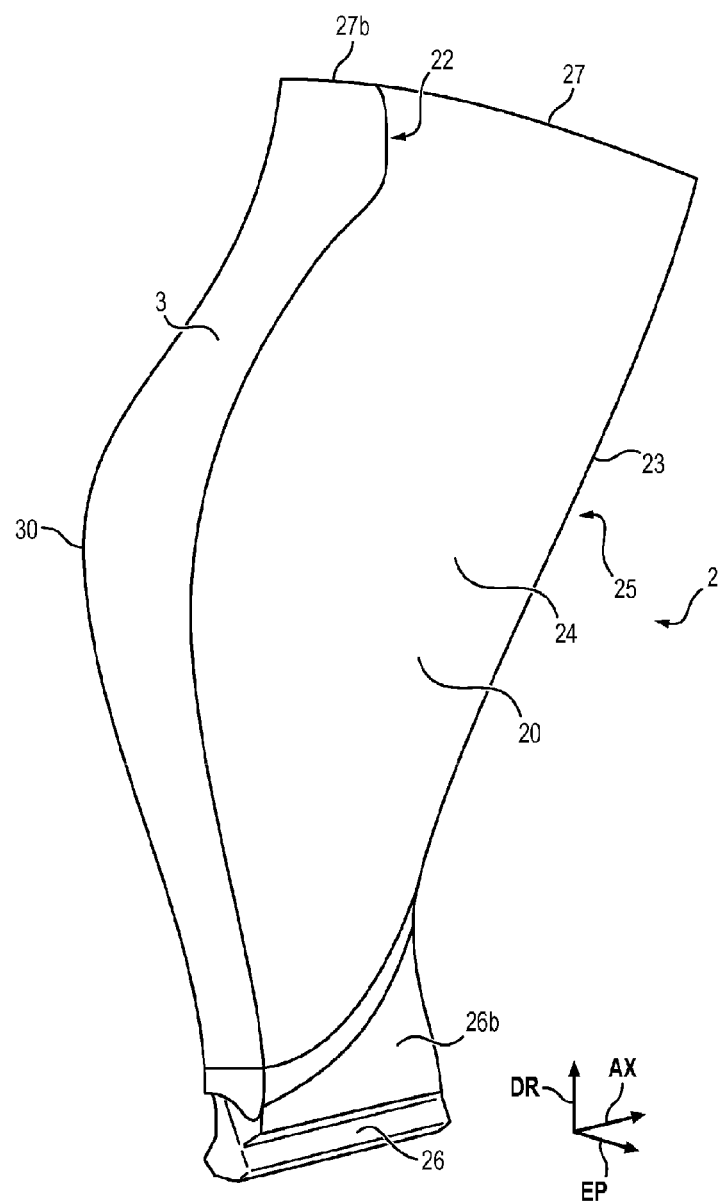
FIG. 4 represents a schematic perspective view of a blade according to one embodiment of the invention.

In FIG. 4, the blade 2 comprises a body 20 made of a composite material, which extends between an upstream edge 22 and a downstream edge 23 which is remote from the upstream edge along the first longitudinal direction AX. The body 20 has a three-dimensional curvature in several plane sections taken perpendicularly to the first longitudinal direction AX.

The composite material body 20 extends between an extrados 24 and an intrados 25 which is remote from the extrados 25 along the second thickness direction EP transverse to the first direction AX. The extrados 24 is turned outwardly in the direction of rotation of the fan blade 2 when the fan hub 250 to which the blade root 26 is fixed rotates about the axial direction AX. The body 20 has a three-dimensional curvature in several plane sections taken perpendicularly to the second thickness direction EP. The extrados 24 is asymmetrical relative to the intrados 25.

The composite material body 20 extends between a blade root 26 and the upper edge 27 of the blade head of the body 20, which is away from the blade root 26 along the third height direction DR, wherein the third height direction DR is transverse to the first and second directions AX and EP. The third height direction DR is oriented from bottom to top of the blade root 26 to the upper blade head edge 27 and to the metallic blade head portion 27b described below. The blade root 26 is used to be fixed to the longitudinal rotary fan hub 250. To this end, the blade root 26 may have a thickened cross-section, which may for example be dovetail-shaped or the like, along the direction EP relative to an intermediate area 26b located between the blade root 26 and the upper blade head edge 27. The blade root 26 can thus be inserted into a peripheral housing of the fan hub 250 to be fixed thereto.

One embodiment of the composite material body 20 is described below. The body 20 of the blade 2 is made of a composite material woven in three dimensions in a resin. The composite material body 20 comprises a resin matrix in which a fibrous reinforcement 4 is embedded comprising warp strands extending at least along the third height direction DR and weft strands extending at least along the first longitudinal direction AX in the finished state of the blade 2. One possible method for manufacturing the body 20 of the blade 2 is as follows. The warp strands are woven in three-dimensions with the weft strands to form the fibrous reinforcement during a first weaving step. Then, during a second molding step, the fibrous reinforcement is placed in a mold, where the fibrous reinforcement is deformed according to a three-dimensional curvature imposed by a prescribed three-dimensional curvature of the internal walls of the mold, then resin is injected around the fibrous reinforcement in the mould, to give the three-dimensional shape of the body 20 of the blade 2 in the finished state. After molding of the resin around the fibrous reinforcement, the warp strands and the weft strands present the three-dimensional curvature of the body 20 in the finished state. The fibrous reinforcement 4 can be formed from a fibrous preform in one piece obtained by three-dimensional or multilayer weaving with varying thickness. It comprises warp and weft strands which can in particular comprise carbon, glass, basalt and/or aramid fibres. The matrix is typically a polymer matrix, for example epoxy, bismaleimide or polyimide. The blade can be formed by molding by means of a vacuum resin injection process of the RTM (Resin Transfer Molding), or VARRTM (Vacuum Resin Transfer Molding) type. By three-dimensional weaving, it will be understood that the warp strands follow tortuous paths in order to bind together weft strands belonging to different layers of weft strands, except for unbindings, it being noted that a three-dimensional weaving, in particular with an interlock weave, can comprise surface two-dimensional weavings. Different three-dimensional weaves can be used, such as interlock, multi-satin or multi-canvas weaves.

Upstream of the upstream edge 22, a metallic reinforcement part 3 (also called shield) forming a leading edge 30 of the blade 2 (FIG. 4) is fixed for example by bonding by means of a layer 7 of adhesive. The reinforcement part 3 has the function of facing the aerodynamic stream entering in flight to overcome the problem of erosion of the blade and protection of the blade against the ingestion of birds.

A metallic blade head portion 27b of the metallic reinforcement part 3 is described below with reference to FIGS. 5 to 17.

The metallic reinforcement part 3 comprises an upstream metallic nose 31, which forms the leading edge 30 of the blade 2 and which is fixed to the upstream edge 22. The upstream metallic nose 31 is formed of a first extrados flank 32b and a second intrados flank 33b, which connect to each other in the direction of the thickness direction EP and which end upstream at the leading edge 30. The metallic reinforcement part 3 comprises a first fin 32, which is connected downstream of the first extrados flank 32b and which is fixed by the layer 7 of adhesive to an upstream portion 28 of the extrados 24 of the body 2. The metallic reinforcement part 3 comprises a second fin 33, which is connected downstream of the second intrados flank 33b and which is bonded by the layer 7 of adhesive to an upstream portion 29 of the intrados 25 of the body 2. The upstream metallic nose 31, the first fin 32 and the second fin 33 delimit a cavity in which the upstream edge 22 and the upstream portions 28, 29 of the extrados 24 and of the intrados 25 are located. The upstream metallic nose 31 is full and is thicker than each fin 32 and 33 in the main area 34 of the part 3. The body 20, the upstream metallic nose 31, the first fin 32 and the second fin 33 have a three-dimensional curvature in first sections taken in several distinct planes perpendicular to the first direction AX, in second sections taken in several distinct planes perpendicular to the second direction EP and in third sections taken in several distinct planes perpendicular to the third direction DR. The part 3 ends along the third height direction DE above its main area 34 with a metallic blade head portion 27b, located upstream of the first blade head edge 27 of the composite material body 2.

With reference to FIGS. 5 to 17, the upstream metallic nose 31 comprises on the metallic blade head portion 27b one or several metallic protrusion(s) 5 with prescribed wear. Each metallic prescribed wear protrusion 5 has a elongated thickness EP5 along the first longitudinal direction AX and a determined non-zero height H along the third height direction DR. The metallic protrusion(s) 5 with prescribed wear is/are delimited by one or several recess(es) 4, which is/are of elongated thickness along the first longitudinal direction AX and which are arranged at least on the metallic blade head portion 27b of the upstream metallic nose 31. The metallic protrusion(s) 5 with prescribed wear is/are configured to be detached at least partially in the presence of a tangential friction in the second thickness direction EP against the metallic blade head portion 27b. The recess(es) 4 and the metallic protrusion(s) 5 with prescribed wear extend, upstream, the first metallic fin 32 and/or the second metallic fin 33 and/or the upstream edge 22 of the composite material body 21. The protrusion 5 thus acts as a fuse in case of too pronounced contact with the abradable material 301 located on the casing 300 of the fan 280, The protrusion 5 with prescribed rupture is present in a self-engaging portion of the blade 2, that is to say a portion that can come into contact with the abradable material 301 of the casing 300 of the fan 280, as defined above. Thus, in case of significant force on the metallic blade head portion 27b, due to a contact with the abradable material 301, the protrusion 5 will be partially detached from the blade, which allows directly leaving the contact with the abradable material 301 and will avoid self-engagement. The dimensions of the protrusion 5 can be determined according to the dimensions of the portions of the blade closest to the abradable material 301. The protrusion 5 forms a thinning of the metallic blade head portion 27b.

With reference to FIGS. 5 to 17, the recess(es) 4 has/have the determined non-zero height H above the main portion 34 and is/are delimited downwardly by a transition surface 8 connecting the protrusion 5 to the main portion 34 of thickness EP34 greater than the thickness EP5 of the protrusion 5. The transition surface 8 is turned upwardly in the third height direction DR and can for example have a rupture 9 of slope or ridge 9 connecting it to the main portion 34 and/or to the protrusion 5.

According to embodiments of the invention according to FIGS. 5 to 12, the longitudinally elongated thickness EP5 of the metallic protrusion 5 with prescribed wear is constant at least over a portion of the determined height H starting from the top. Thus, this portion of the height of the metallic protrusion 5 with prescribed wear does not offer increasing resistance during a friction against the abradable material 30l of the fan casing 300 in case of beginning of self-engagement during the rotation of the blade 2 and wears more easily, which reduces the risks of self-engagement and allows achieving the second objective indicated above.

Figure 5:
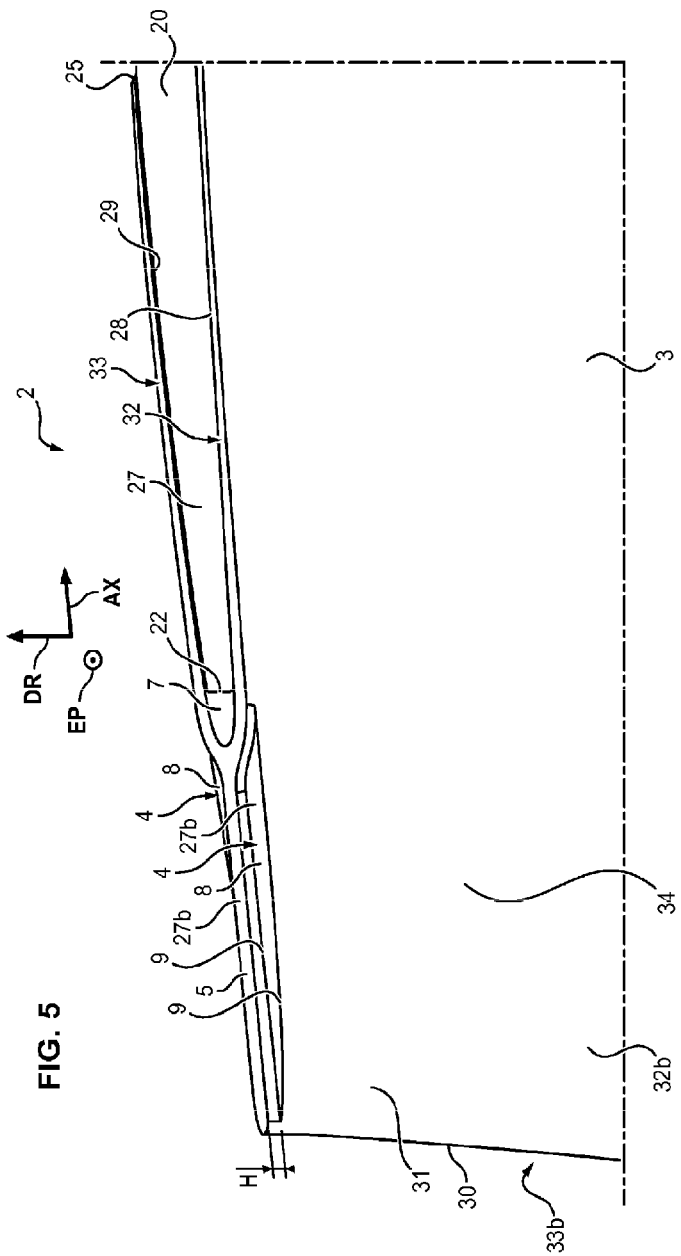
FIG. 5 represents an enlarged schematic perspective view of the blade head according to a first embodiment of the invention.
Figure 8:
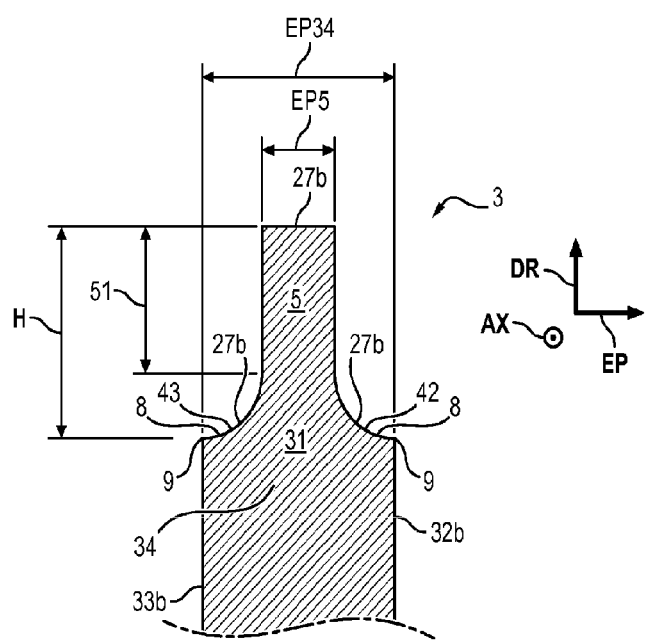
FIG. 8 represents an enlarged schematic cross-sectional view of the blade head of FIG. 7 according to the second embodiment of the invention.
Figure 9:
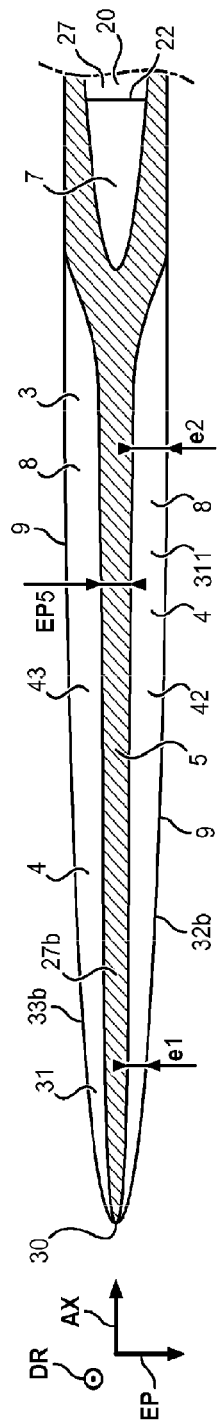
FIG. 9 represents an enlarged schematic top view of the blade head of FIG. 7 according to one embodiment of the invention.

In the embodiment of the invention represented in FIGS. 5, 6 and 9, the longitudinally, elongated thickness EP5 of the metallic protrusion 5 with prescribed wear is constant over the entire determined height H. The transition surface 8 can be planar and for example perpendicular to the protrusion 5.

In the embodiment of the invention represented in FIGS. 7 to 10, the longitudinally elongated thickness EP5 of the metallic protrusion 5 with prescribed wear is constant over an upper portion 51 of the height H.

The transition surface 8 can be curved (for example concave) in several plane sections, which are taken perpendicularly to the first longitudinal direction AX as in FIGS. 7 to 10. The transition surface 8 can form a fillet 42 and/or 43 or a shoulder 42 and/or 43 turned upwardly.

In FIGS. 4 to 10, a first recess 4 formed by a first curved shoulder 42 connected to the first extrados flank 32b of the upstream metallic nose 31 and/or a second recess 4 formed by a second curved shoulder 43 connected to the second intrados flank 33b of the upstream metallic nose 31 can thus be provided.

In other embodiments not represented, the protrusion 5 may be on the side of the first extrados flank 32b of the upstream metallic nose 31, the recess 4 being in this case on the side of the second intrados flank 33b of the upstream metallic nose 31. In other embodiments not represented, the protrusion 5 can be on the side of the second intrados flank 33b of the upstream metallic nose 31, the recess 4 being in this case on the side of the first extrados flank 32b of the upstream metallic nose 31.

In the embodiment of the invention represented in FIGS. 5 to 17, the longitudinally, elongated thickness EP5 of the metallic protrusion 5 with prescribed wear is constant over a major portion 311 of a length of the upstream metallic nose 31 along the longitudinal direction AX For example, the major portion 311 of the length of the upstream metallic nose 31 along the longitudinal direction AX represents at least 50% of the length of the upstream metallic nose 31 along the longitudinal direction X. The length of the upstream metallic nose 31 along the longitudinal direction AX is taken between the leading edge 30 and the upstream edge 22, or between the leading edge 30 and the first metallic fin 32, or between the leading edge 30 and the second metallic fin 33.

In the embodiment of the invention represented in FIG. 9, the metallic blade head portion 27b and/or the metallic protrusion 5 with prescribed wear has the thickness EP5 increasing in the direction from upstream to downstream along the longitudinal direction AX. The recess(es) 4 is/are delimited by the ridges 9 of the upstream metallic nose 31. The thickness e1, e2 occupied by the at least one recess 4 relative to the ridges 9 increases in the direction from upstream to downstream along the longitudinal direction AX over a major portion 311 of the length of the upstream metallic nose 31. $e1<e2$ is thus obtained, with the thickness e1 taken further upstream than the thickness e2. The major portion 311 can have the definition mentioned above.

In the embodiments of the invention represented in FIGS. 1 to 17, the first blade head edge 27 of the composite material body 2 can have another thickness increasing in the direction from upstream to downstream along the longitudinal direction AX on an upstream portion, for example on at least 20% or at least 50% starting from the upstream edge 22, of the length of this first blade head edge 27, taken along the longitudinal direction AX. The length of this first blade head edge 27 can be taken along the longitudinal direction AX between the upstream edge 22 and the downstream edge 23 of the composite material body 20.

Figure 10:
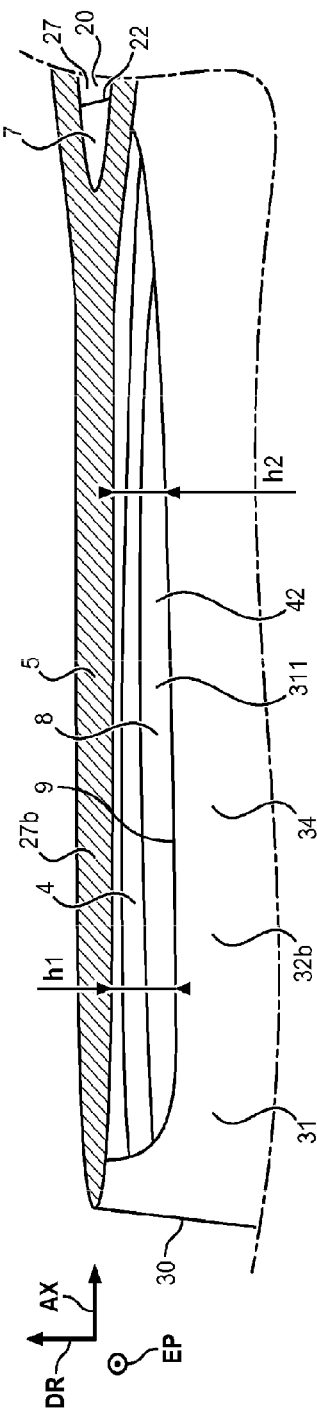
FIG. 10 represents an enlarged schematic perspective view of the blade head of FIG. 7 according to one variant of the second embodiment of the invention in which the height of a recess decreases from upstream to downstream.

In the embodiment of the invention represented in FIGS. 7, 9 and 10, the determined non-zero height H, h1, h2 occupied by the recess(es) 4 and by the protrusion 5 relative to the ridges 9 decreases in the direction from upstream to downstream along the longitudinal direction AX over a major portion 311 of the length of the upstream metallic nose 31. $h1>h2$ is thus obtained, with the height h1 taken further upstream than the height h2. The major portion 311 can have the definition mentioned above.

Figure 11:
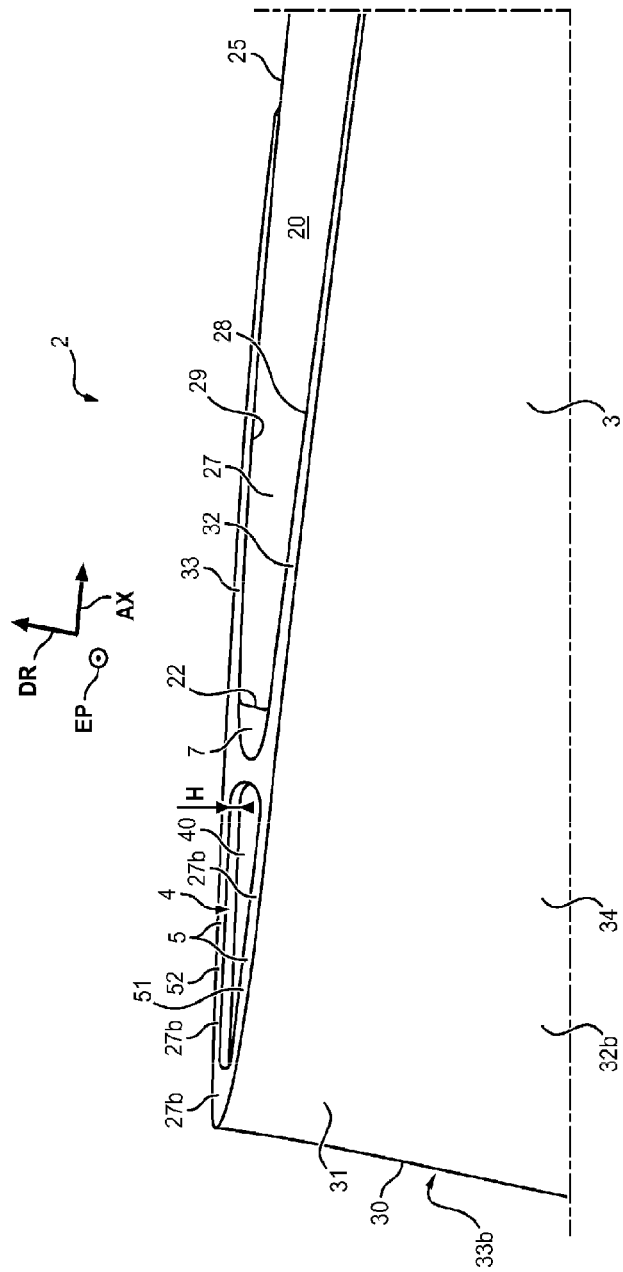
FIG. 11 represents an enlarged schematic perspective view of the blade head according to a third embodiment of the invention.
Figure 12:
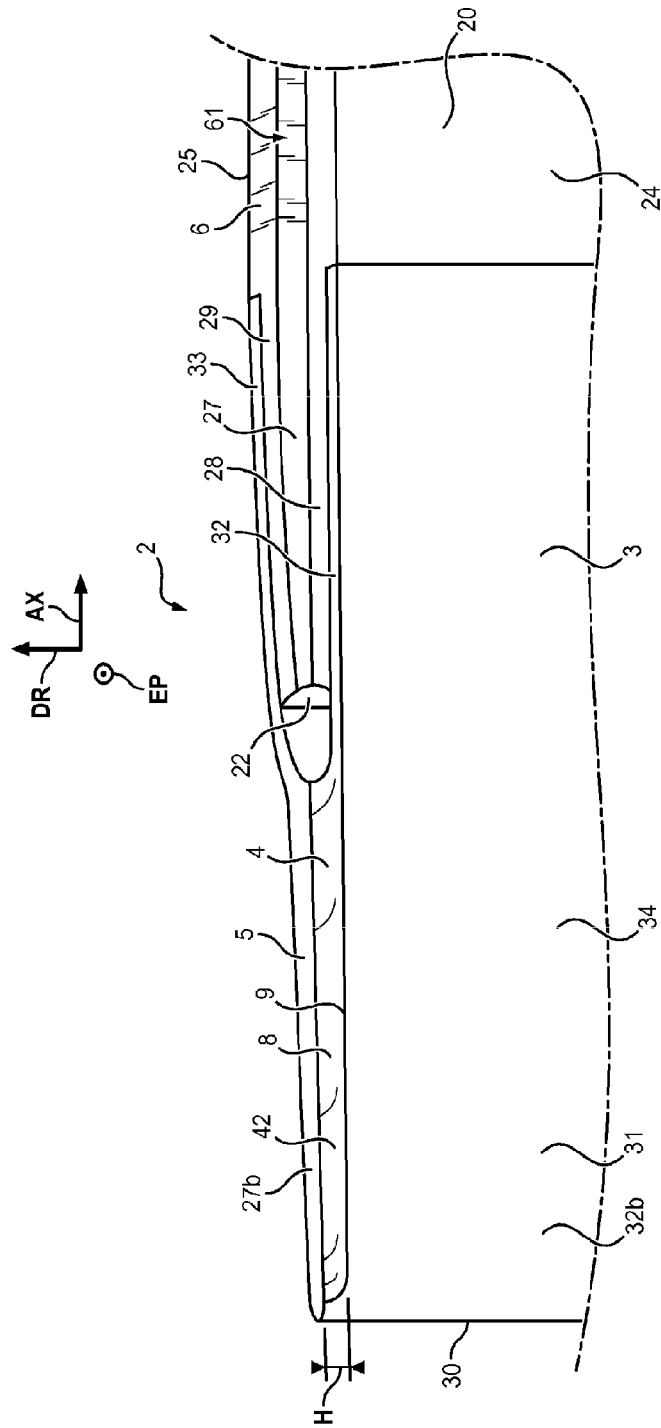
FIG. 12 represents an enlarged schematic perspective view of the blade head according to a fourth embodiment of the invention.

In the embodiment of the invention represented in FIG. 11, the metallic protrusion 5 with prescribed wear surrounds the recesses) 4. The protrusion 5 comprises two first and second longitudinally elongated portions 51 and 52, which extend in the direction DR of the height respectively the first extrados flank 32b of the upstream metallic nose 31 and the second intrados flank 33b of the upstream metallic nose 31. The recess 4 is delimited between the longitudinally elongated portions 51 and 52 and above a bottom 40 located between these longitudinally elongated portions 51 and 52. This allows preserving the aerodynamic profile of the blade, the outer surfaces being unchanged. The recess 4 can be a hollowing which can be made by machining.

In the embodiment of the invention represented in FIGS. 12 to 17, the blade head edge 27 comprises another prescribed wear protrusion 6 (or second protrusion 6 with prescribed wear), which is of elongated thickness along the longitudinal direction AX and which extends, downstream, the metallic protrusion 5 with prescribed wear (or first metallic protrusion 5 with prescribed wear) along the longitudinal direction AX. The other protrusion 6 with prescribed wear is therefore made of the composite material of the body 20 of the blade 2. The other protrusion 6 forms a thinning of the blade head edge 27. The other protrusion 6 thus acts as a fuse in case of too pronounced contact with the abradable material 301 located on the casing 300 of the fan 280. The other protrusion 6 with prescribed rupture is present in a self-engaging portion of the blade 2, that is to say a portion that can come into contact with the abradable material 301 of the casing 300 of the fan 280, as defined above. Thus, in case of significant force on the blade head edge 27, due to contact with the abradable material 301, the other protrusion 6 will be partially detached from the blade, which allows directly leaving the contact with the abradable material 301 and will avoid self-engagement. The dimensions of the other protrusion 6 can be determined according to the dimensions of the portions of the blade closest to the abradable material 301.

The other protrusion 6 with prescribed wear can be bordered by a chamfer 61 extending along the longitudinal direction AX and connected to the intrados 25 (or to the extrados 24 in other embodiments not represented), as illustrated in FIGS. 12, 13 and 14 to 17. The chamfer 61 can be planar.

The other protrusion 6 can end upwardly with a planar surface 62, which is elongated along the longitudinal direction AX and which has a non-zero thickness EP62 as represented in FIGS. 12 and 15 to 17.

Figure 17:
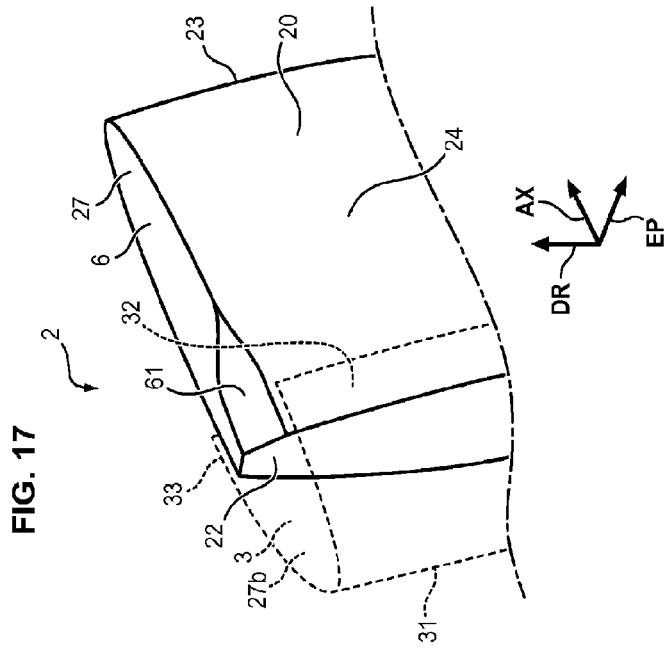
FIG. 17 represents an enlarged schematic perspective view of a portion of the blade head according to an eighth embodiment of the invention.

The chamfer 61 can extend over a portion of the length of the blade head edge 27 starting from its upstream edge 22, as represented in FIG. 17 (where the layer 7 of adhesive has not been represented), to form a local chamfer 61.

Figure 13:
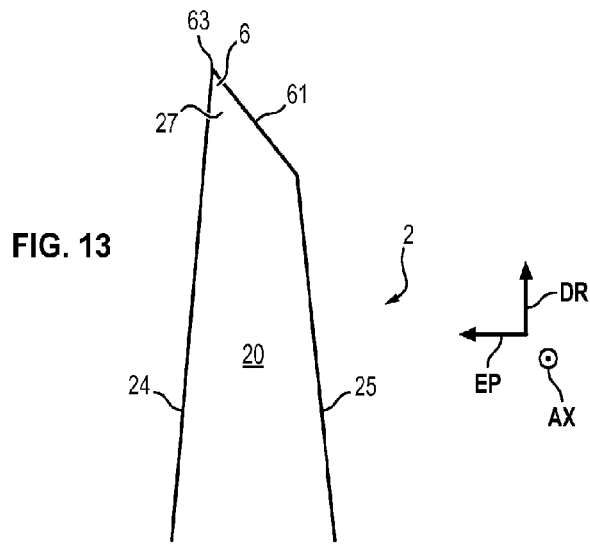
FIG. 13 represents an enlarged schematic cross-sectional view of a portion of the blade head according to a fifth embodiment of the invention.

The other protrusion 6 can end upwardly with a ridge 63, which extends along the longitudinal direction AX and which has zero thickness as represented in FIG. 13.

Figure 14:
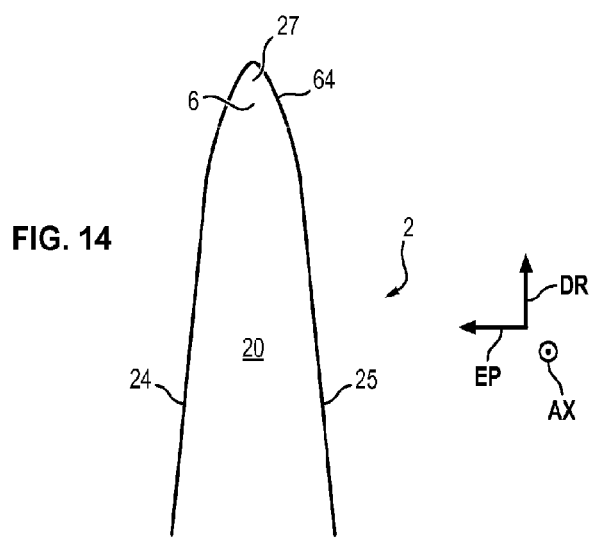
FIG. 14 represents an enlarged schematic cross-sectional view of a portion of the blade head according to a sixth embodiment of the invention.
Figure 15:
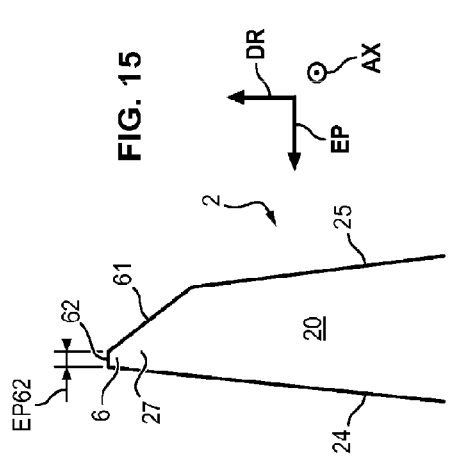
FIG. 15 represents an enlarged schematic cross-sectional view of a portion of the blade head according to a seventh embodiment of the invention.
Figure 16:
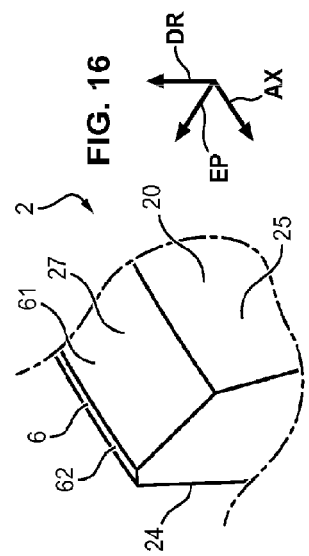
FIG. 16 represents an enlarged schematic perspective view of the portion of the blade head of FIG. 15 according to the seventh embodiment of the invention.

The other protrusion 6 can end upwardly with a rounded edge 64, which extends along the longitudinal direction AX and which is connected to the intrados 25 and to the extrados 24, as represented in FIG. 14. The rounded edge 64 has in several distinct planes transverse to the direction AX a radius of curvature less than that of the intrados 25 and of the extrados 24.

Of course, the embodiments, characteristics, possibilities and examples described above can be combined with each other or selected independently of each other.

The invention claimed is:

1. A rotary turbomachine fan blade, the blade comprising:
a body made of a composite material, having an upstream edge and a downstream edge, between which the body extends along a first longitudinal direction, an extrados and an intrados, between which the body extends along a second thickness direction, which is transverse to the first longitudinal direction, a blade root and a blade head edge, between which the body extends along a third height direction, transverse to the first longitudinal direction and to the second thickness direction, the blade root having a function of attachment on a longitudinal rotary fan hub,
a metallic reinforcement part comprising an upstream metallic nose, which forms a leading edge of the blade and which is fixed to the upstream edge, a first metallic fin, which is connected downstream of a first extrados flank of the upstream metallic nose and which is fixed to an upstream portion of the extrados, and a second metallic fin, which is connected downstream of a second intrados flank of the upstream metallic nose and which is fixed to an upstream portion of the intrados, the upstream metallic nose having a metallic blade head portion, located upstream of the blade head edge,
wherein
the upstream metallic nose comprises at least on the metallic blade head portion at least one recess, which is of longitudinally elongated thickness and which is opening out along the third height direction on the metallic blade head portion,
the at least one recess delimiting on the metallic blade head portion over a determined non-zero height along the third height direction at least one metallic prescribed wear protrusion, which is of longitudinally elongated thickness over a major portion of a length of the upstream metallic nose along the first longitudinal direction and which is configured to be detached at least partially in the presence of tangential friction in the second thickness direction against the metallic blade head portion,
the at least one recess and the at least one metallic prescribed wear protrusion being situated in the first longitudinal direction upstream, the first metallic fin and/or upstream of the second metallic fin and/or upstream of the upstream edge of the body made of a composite material.

2. The blade according to claim 1, wherein the longitudinally elongated thickness of the metallic prescribed wear protrusion is constant at least over a portion of the determined non-zero height.

3. The blade according to claim 1, wherein the longitudinally elongated thickness of the metallic prescribed wear protrusion is constant over a major portion of the length of the upstream metallic nose.

4. The blade according to claim 1, wherein the metallic blade head portion has a thickness increasing from upstream to downstream, the at least one recess is delimited by ridges of the upstream metallic nose, wherein a thickness occupied by the at least one recess relative to the ridges increases from upstream to downstream over a major portion of a length of the upstream metallic nose.

5. The blade according to claim 1, wherein the metallic blade head portion has a thickness increasing from upstream to downstream, the at least one recess is delimited by ridges of the upstream metallic nose, wherein said determined non-zero height occupied by the at least one recess relative to the ridges decreases from upstream to downstream over a major portion of a length of the upstream metallic nose.

6. The blade according to claim 1, wherein the at least one recess is formed by at least one shoulder, which is connected to the first extrados flank of the upstream metallic nose.

7. The blade according to 6, wherein the at least one shoulder is curved.

8. The blade according to claim 1, wherein the at least one recess is formed by a shoulder, which is connected to the second intrados flank of the upstream metallic nose.

9. The blade according to claim 1, wherein the upstream metallic nose comprises as a recess at least a first recess, which is formed by a first shoulder connected to the first extrados flank of the upstream metallic nose, and at least a second recess, which is formed by a second shoulder connected to the second intrados flank of the upstream metallic nose.

10. The blade according to claim 1, wherein the metallic prescribed wear protrusion surrounds the at least one recess.

11. The blade according to claim 1, wherein the blade head edge comprises another prescribed wear protrusion, which is of longitudinally elongated thickness and which is situated downstream the at least one metallic prescribed wear protrusion.

12. A rotary turbomachine fan, comprising a longitudinal rotary fan hub and a plurality of blades according to claim 1, which are fixed by their blade root to the longitudinal rotary fan hub.

13. A turbomachine comprising the rotary turbomachine fan according to claim 12, and, downstream of the turbomachine rotary fan, a low-pressure compressor, a high-pressure compressor, a combustion chamber, a high-pressure turbine and a low-pressure turbine.

* * * * *